Feb. 9, 1960

S. SCHNELL 2,924,073

ACTUATING CYLINDER

Filed March 14, 1958

2 Sheets-Sheet 2

INVENTOR:
STEVE SCHNELL

BY Gravely, Lieder & Woodruff
ATTORNEYS.

United States Patent Office 2,924,073
Patented Feb. 9, 1960

2,924,073

ACTUATING CYLINDER

Steve Schnell, St. Louis, Mo., assignor to Wagner Electric Corporation, St. Louis, Mo., a corporation of Delaware Application March 14, 1958, Serial No. 721,417

13 Claims. (Cl. 60—54.6)

This invention relates to brake assemblies and in particular to an actuating cylinder to control the actuation of the brakes and the automatic adjusting mechanism therefor.

In past brake assemblies employing an automatic adjusting mechanism, a predetermined movement or stroke length of the brake actuating cylinder initiated the function of the adjusting mechanism to automatically compensate for wear of the brake friction elements; therefore, the brakes were often adjusted at high fluid pressures resulting in undesirable extrusion of the rubber parts in the actuating cylinder and in an undesirable increase in pressure fluid displacement. Also when the brakes were fully applied, the various lever arms of the brakes tended to spring or distort resulting in a false or increased stroke length for the brake actuating cylinder which often permitted undesirable and unecessary functioning of the adjusting mechanism.

An object of the instant invention is to provide a brake actuating cylinder which overcomes the abovementioned undesirable features.

Another object of the instant invention is to provide a brake actuating cylinder which is responsive not only to stroke length but also fluid pressure to control the automatic brake adjusting mechanism.

Still another object of the instant invention is to provide a brake actuating cylinder having damping means obviating unwarranted brake adjustments due to successive fluid pressure fluctuations.

These and other objects and advantages will become apparent hereinafter.

Briefly the present invention is embodied in a brake actuating cylinder having telescopically arranged housings relatively movable in response to an applied fluid pressure, a stationary piston in one of said housings having a spring loaded damping piston slidably received therein, actuating and working ports in the other of said housings with valve means normally interrupting communication therebetween, and a connection between said valve means and damping piston whereby communication is established between said actuating and working ports when the movement of said housings exceeds a predetermined amount and the applied fluid pressure is less than a predetermined amount.

Figure 1:
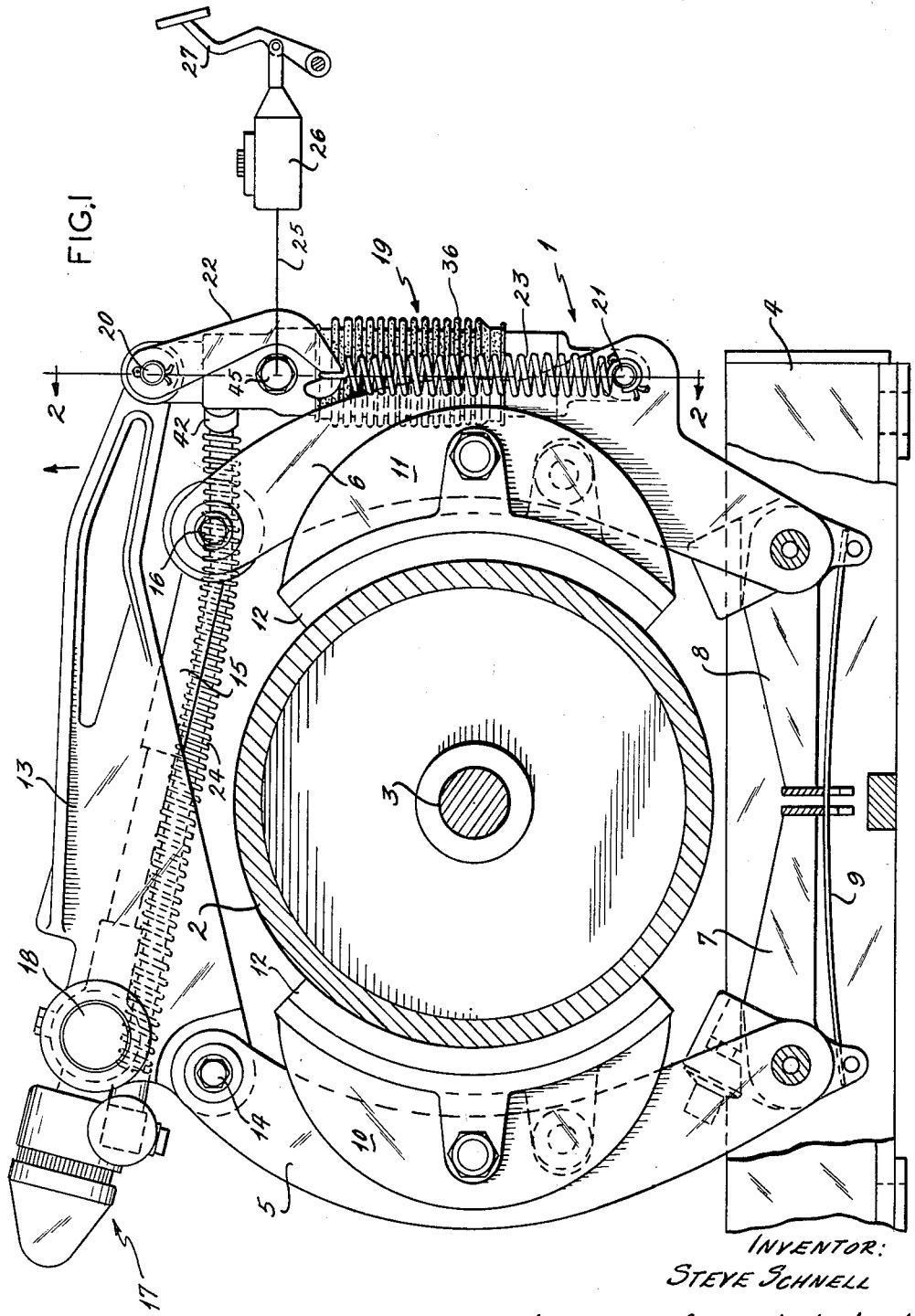
Figure 2:
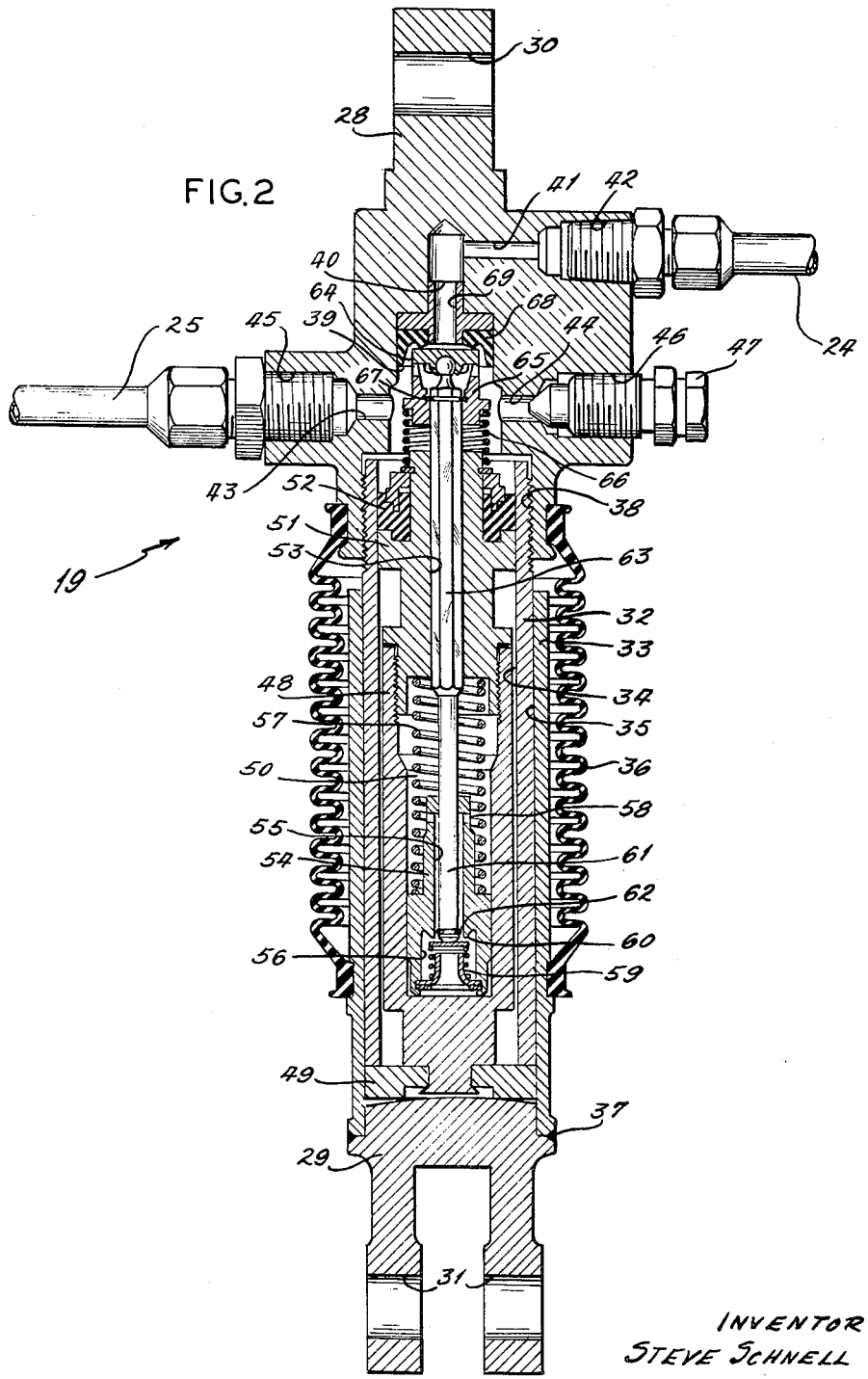

This invention also consists in the parts and in the arrangement and combination of parts hereinafter described and claimed. In the accompanying drawings which form a part of this specification and wherein like numerals refer to like parts wherever they occur:

Fig. 1 is an elevational view of a brake assembly having an automatic adjusting mechanism and showing the actuating cylinder embodying the invention associated therewith, and Fig. 2 is a cross-sectional view taken along the line 2—2 in Fig. 1 showing the preferred embodiment of the invention in detail.

Referring now to Fig. 1, the brake device 1 comprises a drum 2 secured to a shaft 3 and is provided with a base portion 4 to which the lower ends of levers 5 and 6 are pivoted having arms 7 and 8 associated with a leaf type return spring 9. Brake shoe assemblies 10 and 11, provided with brake linings 12, are carried near the midportions of levers 5 and 6, respectively, for engagement with the drum 2 while the upper ends of said levers 5 and 6 are pivotally connected with the toe end of an L-shaped lever 13 by a pin 14 and with one end of an adjusting link 15 by a pin 16, respectively. The other end of the adjusting link 15 is adapted to be adjustably connected with an automatic brake adjusting mechanism 17, which is in turn pivotally connected with the heel end of the L-shaped lever 13 by a pin 18. The brake adjusting mechanism 17 is disclosed in my United States Patent No. 2,363,152 issued November 21, 1944, and forms no part of the present invention; however, the function of said brake adjusting mechanism is to decrease the distance between the pivotal connections 16 and 18 on the adjusting link 15 when actuated by the actuating cylinder 19 in order to reposition the shoes 10 and 11 relative to the drum 2.

The brake actuating cylinder 19 is interposed between the outer end of the L-shaped lever 13 and the lever 6 and pivotally connected therewith by pins 20 and 21, respectively. The pin 20 also pivotally receives a depending arm 22, and an actuating cylinder return spring 23 is biased between said depending arm and the pin 21. A conduit 24 is interposed between the adjusting mechanism 17 and the working port of the actuating cylinder 19, and another conduit 25 leads from the actuating port of said actuating cylinder to a suitable pressure source, such as a master cylinder device 26, which is manually operated by a pedal 27.

Referring now to Fig. 2, the brake actuating cylinder 19 is provided with upper and lower housings 28 and 29 having mounting pin holes 30 and 31, respectively, for pivotal connection with pins 20 and 21, as previously described. The housings 28 and 29 are provided with cylindrical telescopically arranged extensions or cylinders 32 and 33 having bores 34 and 35, respectively, and a resilient boot 36 is interposed between the upper housing 28 and lower housing extension 33 to prevent the entrance of foreign particles into actuating cylinder 19. The lower end of the extension 33 is fixedly attached to the housing 29 by suitable means, such as the weld 37, and the upper end of the extension 32 is threadedly received in a counterbore 38 of the housing 28, said counterbore being axially aligned with an intermediate bore 39 and bore 40. A passage 41 is interposed between the bore 40 and the working port 42 which receives the conduit 24 to the adjusting mechanism 17, as previously mentioned, and opposed passages 43 and 44 intersect the intermediate bore 39 terminating in actuating and bleeder ports 45 and 46, respectively. The actuating port 45, which serves as an inlet and outlet port, receives the conduit 25 from the master cylinder 26, as previously mentioned, and the bleeder port 46 is normally closed by a bleeder screw 47.

A piston 48 is coaxially arranged in the extension bore 34 by a positioning member 49 carried on the lower end thereof in abutment with the extension bore 35 and the end wall thereof. A cylindrical chamber 50 is axially provided in the piston 48, and a piston head 51 is threadedly received in the upper end of said chamber. The piston head 51 carries a seal assembly 52 interposed between the extension bore 34 and said piston head, and an axial passage or bore 53 is provided through said piston head communicating with the piston chamber 50.

A damping piston 54 having an aligned stepped bore 55 and counterbore 56 therethrough is slidably received in the piston chamber 50 and is normally biased into abutment with the end wall thereof by the compressive force of a spring 57 interposed between said damping piston and the lower end of the piston head 51. A plurality of pressure fluid passages 58 are provided in the larger portion of the damping piston stepped bore 55. A spring biased check valve member 59 is positioned in the counterbore 56 for sealable engagement with the shoulder or seat 60 formed at the juncture of the stepped bore 55 and counterbore 56. A valve stem 61 is slidably received by the smaller portion of the stepped bore 55 and extends coaxially through the larger portion thereof into abutment with the check valve 59 normally maintaining said check valve in an unseated position, said valve stem carrying displacement preventative means, such as the snap ring 62, adjacent its lower end. The stem 61 extends upwardly into slidable engagement with the piston head bore 53 having a hexagonal shape to provide pressure fluid passages 63 between said stem and piston head bore; and, a valve 64 is pivotally received on the upper end of said stem. A spring retainer 65 is slidably received on the stem 61 and is normally biased into abutment with the valve 64 to prevent valve cocking by the compressive force of a spring 66 interposed between said spring retainer and the seal assembly 52; and, displacement preventive means, such as the snap ring 67, is carried adjacent the upper end of the stem 61 for engagement with said spring retainer. In this manner, the spring 66 and retainer 65 normally biases the valve 64 into sealable engagement with a valve seat assembly 68 having a passage 69 therethrough, said seat assembly being positioned in abutment with the shoulder formed by the juncture of the upper housing bore 40 and the smaller portion of the intermediate bore 39; therefore, pressure fluid communication between the working port 42 and the actuating port 45 is normally interrupted by the abovementioned sealable engagement between the valve 64 and the cooperating seat 68.

*Operation*

Assuming that the shoes 10 and 11 of the brake device are initially properly adjusted relative to the drum 2, an operator applied force on the pedal 27 actuates the master cylinder 26 displacing pressure fluid at a relatively low fluid pressure into the actuating cylinder 19 through the conduit 25, the actuating port 45, and the passageway 43. This relatively low applied fluid pressure acts on the effective areas of the piston head 51 and seal assembly 52, and the opposing effective areas of the counterbore 38, seat assembly 68, and valve 64 creating forces which effect relative movement between the housings 28 and 29. From the above described structure, it is apparent that the housing 28 moves upwardly relative to the housing 29, and the lever 13 is moved in the direction of the arrow in Fig. 1 thereby causing the brake shoes 10 and 11 to move in a drum engaging direction; and, the arms 7 and 8 deflect the leaf spring 9 while the cylinder return spring 23 is tensioned between said housings. The applied fluid pressure establishes a small pressure differential across said valve, or between the intermediate bore 39 and bore 40, which creates a force to engage said valve with said seat; consequently, the valve 64 and stem 61 moves upwardly along the housing 28, and communication between the actuating and working ports 45 and 42, respectively, remains interrupted. The applied fluid pressure is appreciably increased as the shoes 10 and 11 are moved into frictional engagement with the drum 2 energizing the brake device 1, and as a result, the force seating the valve 64 is also increased appreciably. In this instance, due to the proper adjustment between the shoes 10 and 11 and the drum 2, the upward movement of the stem 61, which is the same as the stroke of the actuating cylinder 19, will normally not exceed a predetermined amount, said predetermined amount being the length of the larger portion of the damping piston stepped bore 55.

In the event the various lever arms of the brake device 1 distort or spring when said brake device is fully energized, the stroke of the actuation cylinder 19 could thereby be increased above the predetermined length so that the snap ring 62 on the stem 61 is moved upwardly into abutment with the shoulder formed in the stepped bore 55 of the damping piston 54. Further upward movement of the stem 61 carries the damping piston 54 upwardly in the chamber 50 against the compressive force of the spring 57, and the check valve 59 permits pressure fluid flow through the passages 58, the stepped bore 55, and the counterbore 56 of said damping piston in order to prevent damping during its upward movement; however, when the shoes 10 and 11 are properly adjusted relative to the drum 2, the aforementioned increased force tending to seat the valve 64 is greater than the opposing compressive force of the spring 57. As a result, the valve 64 remains seated and continues to interrupt pressure fluid communication between the actuating and working ports 45 and 42, respectively, preventing actuation of the adjusting mechanism 17 under the increased fluid pressure and obviating unwarranted adjustments of the brake device 1.

If the operator releases the force applied to the pedal 27, the fluid pressure in the actuating cylinder 19 is alleviated; and, if the operator then quickly reapplies the force to said pedal so as to super-charge said actuating cylinder, the increased fluid pressure is quickly re-established therein. In this instance when the fluid pressure is reduced in the actuating cylinder the pressure differential across the valve 64 is eliminated, as is the force tending to seat said valve, and the compressive force of the spring 57 acts to move the damping piston 54, and consequently the stem 61, downwardly to unseat said valve 64; however, the damping piston check valve 59 is closed to prevent pressure fluid flow through said damping piston. The pressure fluid flow is severely restricted between the periphery of said damping piston and the sidewall of the chamber 50 thereby damping or impeding downward movement of said damping piston. In this manner, the damping action of the piston 54 opposes the compressive force of the spring 57, and the valve 64 remains sealably engaged with the seat 68. When the increased fluid pressure is rapidly re-established in the actuating cylinder 19, the aforementioned pressure differential is again established across the valve 64 to again create the increased force to further engage said valve with the seat 68. Therefore, the damping piston 54 prevents the unseating of the valve 64 which prevents fluid pressure communication between the actuating and working ports 45 and 42, respectively, during successive rapid braking applications. In this manner, actuation of the adjusting mechanism 17 and unwarranted adjustment of the brake device 1 due to successive applied fluid pressure fluctuations are obviated.

When the desired braking effect is attained, the operator applied force is removed from the brake pedal 27 releasing the master cylinder 26 and the applied fluid presssure; and, the force of the tensioned spring 23 moves the housing 28 downwardly to its original position which, in turn, moves the valve 64 and stem 61 downwardly therewith. This downward movement abuttingly engages the lower end of the stem 61 with the check valve 59 opening said check valve and allowing pressure fluid flow through the damping piston 54 whereby the compressive force of the spring 57 then moves said damping piston downwardly in the chamber 50 to its original position. In this manner, the spring 23 returns the component parts of the actuating cylinder 19 to their original positions upon the release of the applied fluid pressure, and the leaf spring 9 returns the component parts of the brake device 1 to their original positions.

As the brake linings 12 wear due to repeated frictional engagement, slack develops in the brake device 1, and it is necessary to increase the stroke of the actuating cylinder 19 in order to energize the brake device 1. In accordance with the present invention, the actuating cylinder 19 is operable to controllably actuate the adjusting mechanism 17 which adjusts the brake device 1 and automatically compensates for the abovementioned slack and lining wear only when said actuating cylinder attains a predetermined stroke and the applied fluid pressure is a predetermined minimum, as will be described hereinafter.

When the brake linings have worn to cause slack in the brake device 1, an operator applied force on the pedal 27 actuates the master cylinder 26 to displace pressure fluid to the actuating cylinder 19 via the conduit 25 and actuating port 45. Since the abovementioned slack conditions prevail, a greater volume of pressure fluid is necessarily displaced at a low fluid pressure to compensate for the additional displacement of the upper housing 28, or the increased length of stroke thereof. This low fluid pressure acts on the effective areas of the piston head 51 and seal assembly 52 and the opposing effective areas of the counterbore 38, seat assembly 68, and valve 64 creating forces which cause the upward movement or stroke of housing 28 and the lever 13 against the opposing, relatively light forces of the springs 9 and 23 to energize the brake device 1, as previously described. The low fluid pressure also establishes a small pressure differential between the intermediate bore 39 and bore 40 which acts on the effective area of the valve 64 creating a force to engage said valve with the seat 68; consequently, said valve and the stem 61 move upwardly along with the housing 28 normally interrupting communication between the actuating and working ports 45 and 42, respectively.

Initial upward movement of the stem 61 permits the damping piston check valve 59 to seat; and, assuming the length of stroke to be greater than the lost motion connection between the stem 61 and the damping piston 54, the snap ring 62 carried on said stem is moved upwardly therewith into abutment with the shoulder formed in the stepped bore 55. Further upward movement of the stem 61 provides concert movement of the damping piston 54 upwardly in the chamber 50 against the opposing compressive force of the spring 57, and the check valve 59 permits pressure fluid flow through the passages 58, the stepped bore 55, and the counterbore 56 of the damping piston 54 in order to prevent damping during the upward movement of said damping piston. When the spring rate or compressive force of the spring 57 is great enough to equal the relatively small force acting to seat the valve 64, further upward movement of the housing 28 by the relatively low, applied fluid pressure disengages the seat 68 from the valve 64 to establish pressure fluid communication between the actuating and working port 45 and 42, respectively. In this manner, the low, applied fluid pressure is afforded access to the adjusting mechanism 17 via said working port and the conduit 24. Meanwhile, due to the disengagement of the seat 68 from the valve 64, further upward movement of the damping piston 54 in the chamber 50 is obviated, and the check valve 59 closes preventing fluid pressure flow therethrough to substantially maintain the position of said damping piston in said chamber in opposition to the compressive force of the spring 57, as previously described. When the stroke of the actuating cylinder 19 moves the lever 13 thruogh an arc great enough to move the shoes 10 and 11 into frictional engagement with the drums 2, the applied fluid pressure is increased not only energizing the brake device 1 but also actuating the adjusting mechanism 17 whereby the position of said shoes will automatically be adjusted relative to said drum in order to take up the slack as said brake device is de-energized.

When the desired braking effect is attained, the operator applied force is removed from the brake pedal 27 releasing the master cylinder 26 and the applied fluid pressure; and, the adjusting mechanism 17 functions to take up the slack in the brake device 1 by decreasing the length of the lever 15 between the pivotal connections 16 and 18 which repositions the shoes 10 and 11 relative to the drum 2 by a predetermined amount. The reduction of applied fluid pressure also permits the tensioned spring 23 to move the housing 28 downwardly whereby the seat 68 again sealably engages the valve 64, and said valve and stem 61 are moved downwardly therewith to their original positions. This downward movement of the stem 61 unseats the check valve 59 allowing pressure fluid flow through the damping piston 54 whereby the compressive force of the spring 57 then moves said damping piston to its original position. In this manner, the spring 23 returns the component parts of the actuating cylinder 19 to their original positions, and the leaf spring 9 returns the component parts of the brake device 1 to their newly adjusted positions.

From the foregoing, it is obvious that the actuating cylinder 19 is responsive not only to stroke length but also to fluid pressure to control adjustment of the brake device 1. If the stroke of the actuating cylinder 19 exceeds a predetermined length before the fluid pressure applied thereto exceeds a predetermined amount, the upward movement of the valve 64, stem 61, and damping piston 54 is opposed by compressive force of the spring 57. When the compressive force of the spring 57 overcomes the force of the applied fluid pressure seating the valve 64, the position of the damping piston 54 is maintained in the chamber 50 due to the damping action of the check valve 59; and, the continued upward movement of the housing 28 disengages seat 68 from the valve 64 allowing the applied fluid pressure to actuate the adjusting mechanism 17 which subsequently adjusts the brake device 1. If the fluid pressure applied to the actuating cylinder 19 exceeds a predetermined amount before the stroke of said actuating cylinder exceeds a predetermined length, the force of the applied fluid pressure seating the valve 64 prevents the disengagement thereof by the opposing compressive force of the spring 57 so that the function of the adjusting mechanism is obviated.

It is apparent that actuating cylinder 19 obviates unwarrented adjustments of the brake device 1 due to successive applied fluid pressure fluctuations. When the stroke of the actuation cylinder 19 exceeds the predetermined length, the stem 61 carries the damping piston 54 upwardly in the chamber 50 against the compressive force of the spring 57. If the applied fluid pressure is released and quickly reapplied so as to super-charge the actuating cylinder 19, the check valve 59 in the damping piston 54 closes thereby damping or impeding downward movement of the piston 54 by the compressive force of the spring 57 since pressure fluid flow is severely restricted between the periphery of said damping piston and the wall of the chamber 50. As a result of this impeded movement, the position of the valve 64, stem 61, and damping piston 54 is substantially maintained in the chamber 50, and the valve 64 is not disengaged from the seat 68. As a result, communication between the actuating and working ports 45 and 42, respectively, remains interrupted, and the function of the adjusting mechanism 17 is obviated.

It is now apparent that there has been provided an actuating cylinder which is responsive not only to stroke length but also fluid pressure to control the function of the adjusting mechanism in a brake device and which fulfills all of the objects and advantages sought therefor.

The foregoing description and accompanying drawings have been presented only by way of illustration and example, and changes and alterations in the instant disclosure, which will be apparent to one skilled in the art, are contemplated as within the scope of the instant invention which is limited only by the claims which follow.

What I claim is:

1. An actuating cylinder comprising a housing having actuating and working ports therein, piston means in said housing and having a chamber therein, said housing and piston means being adapted for relative movement in response to fluid pressure actuation, valve means normally closing communication between said ports and movable with said housing in response to said fluid pressure actuation, and the yieldable means in said chamber having a lost motion connection with said valve means to exert a yieldable force thereon in opposition to said fluid pressure actuation.

2. An actuating cylinder comprising telescopically arranged housings, said housings adapted for relative movement, a piston slidable in one of said housings and in abutment with the other of said housings, said piston having a chamber therein, actuating and working ports in said one of said housings, valve means normally engaged with said one of said housings to interrupt pressure fluid communication between said ports, said valve means responsive to the actuating fluid pressure for movement with said one of said housings, a valve stem carried by said valve means, damping means slidable in said chamber, a lost motion connection between said valve stem and damping means, said valve means, valve stem, and damping means movable in concert upon predetermined relative movement of said housings, and resilient means in said chamber to limit movement of said damping means whereby said valve means is unseated when the actuating fluid pressure acting thereon is less than a predetermined amount.

3. An actuating cylinder comprising a housing having actuating and working ports therein, piston means having relative movement with said housing in response to fluid pressure actuation, valve means acted on by said fluid pressure and normally closing communication between said ports, and yieldable means contacted by said valve means in response to actuation of said housing and piston means by a fluid pressure below an opposing force exerted by said yieldable means to establish communication between said ports.

4. A fluid pressure actuated cylinder comprising a housing having actuating and working ports therein, piston means in said housing and having a chamber therein, said piston means and housing adapted for relative movement, valve means controlling said ports, said valve means responsive to the actuating fluid pressure for movement with said housing, a damping piston slidable in said chamber, a lost motion connection between said valve means and damping piston, said valve means and damping piston movable in concert in response to a predetermined relative movement of said housing and piston means, yieldable means in said chamber to oppose said concert movement in one direction and unseat said valve means when the force of said yieldable means exceeds the force of the actuating fluid pressure acting on said valve means, and means including said damping piston to oppose the force of said yieldable means and prevent concert movement of said valve means and damping means in the opposite direction.

5. A fluid pressure actuated cylinder comprising a housing having actuating and working ports therein, piston means in said housing, said piston means and housing adapted for relative movement, valve means normally interrupting communication between said ports, said valve means responsive to the actuating fluid pressure for movement with said housing, a damping piston slidable in said piston means, means to connect said valve means and damping piston for concert movement, resilient means to oppose said concert movement and unseat said valve means when the actuating fluid pressure acting to engage said valve means with said housing is below a predetermined amount, and means including said damping piston to maintain the unseated position of said valve means in opposition to the force of said resilient means.

6. A fluid pressure actuated cylinder comprising a housing having actuating and working ports therein, piston means in said housing, said housing and piston means adapted for relative movement, valve means controlling communication between said ports and responsive to the actuating fluid pressure for movement with said housing, damping means slidable in said piston means, means connecting said valve means and damping means for concert movement, and yieldable means in said piston means to oppose said concert movement and unseat said valve means when the actuating fluid pressure is relatively low, said damping means opposing said yieldable means when said valve means is unseated.

7. A fluid pressure actuated cylinder comprising a housing having actuating and working ports therein, piston means in said housing, said housing and piston means adapted for relative movement, a chamber in said piston means, valve means normally interrupting pressure fluid communication between said ports, said valve means responsive to the actuating fluid pressure for movement with said housing, a damping piston slidable in said chamber, a lost motion connection between said valve means and damping piston to effect concert movement therebetween upon predetermined movement of said valve means, resilient means in said chamber to oppose said concert movement of said damping means and valve means, said resilient means acting to unseat said valve means when the actuating fluid pressure is below a predetermined amount, and uni-directional valve means in said damping piston to effect damping of said damping piston in said chamber in opposition to said resilient means.

8. A fluid pressure actuated cylinder comprising a housing having actuating and working ports therein, a piston slidable in said housing and having a chamber therein, said housing and piston adapted for relative movement, valve means normally interrupting communication between said ports, said valve means responsive to the fluid pressure for movement with said housing, a damping piston slidable in said chamber and having a passage therethrough, a valve stem connected with said valve means and extending into said passage, a lost motion connection between said valve stem and damping piston, said valve means and damping piston movable in concert upon predetermined movement of said valve means when the fluid pressure exceeds a predetermined amount, a uni-directional valve in said passage of said damping piston normally allowing pressure fluid flow therethrough upon concert movement of said valve means and damping piston, resilient means in said chamber biased to oppose said damping piston upon said concert movement, said unidirectional valve responsive to a decrease in the fluid pressure to close said passage and effect damping of said damping piston in said chamber in opposition to said resilient means.

9. An actuating cylinder comprising telescopically positioned first and second housings adapted for relative axial movement, a piston in fixed position in said first housing and slidable relative to said second housing, said piston having a chamber therein, an actuating port connected to a pressure source for providing fluid pressure between said piston and said second housing, a working port through which pressure fluid is adapted to be displaced, valve means normally interrupting communication between said ports and responsive to fluid pressure for movement with said second housing, said valve means including a stem extending into said chamber and having an abutment thereon, a damping piston in said chamber, a lost motion connection between the abutment on said stem and said damping piston, said lost motion connection providing concert movement between said valve means and damping piston upon relative movement of said second housing and piston greater than the length of said lost motion connection, resilient means opposing said concert movement in one direction to unseat said valve means and establish communication between said ports when the force of said resilient means exceeds the force of the fluid pressure acting on said valve means, and means including said damping means to allow said concert movement in said one direction and to oppose said concert movement in the opposite direction in opposition to the force of said resilient means when said valve means is unseated.

10. A fluid pressure actuated cylinder comprising a housing having a bore with actuating and working ports in communication with one end thereof, a piston slidable in the bore of said housing and having a chamber in communication with said bore, said piston being adapted for movement relative to said housing away from said one end of the bore during actuation of the cylinder, a valve in said bore responsive to fluid pressure for interrupting communication between said ports, a damping piston slidably positioned in the chamber of said piston and having a passage therethrough, a valve stem connected to said valve and extending into said passage, said valve stem having predetermined movement relative to said damping piston when said valve and housing are moved relative to said piston, a lost motion connection between said valve stem and damping piston determining the length of the relative movement therebetween and providing concert movement of the damping piston with the valve stem when the relative movement between the valve and housing and the piston is greater than the predetermined length of the lost motion connection, a spring in said chamber opposing concert movement of said valve stem and damping piston whereby communication between said ports will be established when the force of said spring exceeds the force of the fluid pressure acting on said valve, and a uni-directional valve in the passage of said damping piston permitting pressure fluid flow therethrough during concert movement of said valve stem and damping piston and restricting return flow of pressure fluid in response to a decrease in fluid pressure in said bore whereby movement of said damping piston by said spring is retarded.

11. A fluid pressure actuated cylinder comprising a housing having actuating and working ports therein, piston means in said housing and movable relatively therewith, valve means controlling said ports and responsive to the actuating fluid pressure for movement with said housing, damping means slidable in said piston and connected for concert movement with said valve means, resilient means to oppose said concert movement in one direction, and means including said damping means to prevent said concert movement in an opposite direction in opposition to said resilient means.

12. A fluid pressure actuated cylinder comprising a housing having actuating and working ports therein, piston means in said housing and movable relatively therewith, valve means normally interrupting communication between said ports and responsive to the actuating fluid pressure for movement with said housing, damping means slidable in said piston means, connecting means between said valve means and damping means, said valve means and damping means movable in concert in response to relative movement of said housing and piston means greater than a predetermined distance, a spring to oppose said concert movement of said valve means and damping means whereby communication between said ports is established when the force of said spring exceeds the force of the actuating fluid pressure engaging said valve means with said housing, said damping means opposing the force of said spring upon establishment of communication between said ports.

13. A fluid pressure actuated cylinder comprising relatively movable housings having a chamber therebetween, means for developing fluid pressure in said chamber for actuating said housings apart, an outlet from said chamber, valve means responsive to fluid pressure in said chamber for closing said outlet, a second chamber in one of said housings having a damping piston yieldably biased away from said first-mentioned chamber, said valve means having a lost motion connection with said damping piston and adapted to move it against said yieldable force when the force of said fluid pressure acting on said valve means exceeds said yieldable force, and a uni-directional valve in said damping piston adapted to provide fluid flow therepast during movement of said damping piston by said valve means.

References Cited in the file of this patent

UNITED STATES PATENTS

| 2,363,152 | Schnell | Nov. 11, 1944 |
| 2,769,429 | Lencioni | Nov. 6, 1956 |

OTHER REFERENCES

| 88,803 | Sweden | Mar. 16, 1937 |